(12) United States Patent
Kamiyama

(10) Patent No.: US 9,797,539 B1
(45) Date of Patent: Oct. 24, 2017

(54) PIPE REHABILITATION METHOD

(71) Applicant: SHONAN GOSEI-JUSHI SEISAKUSHO K.K., Kanagawa (JP)

(72) Inventor: Takao Kamiyama, Kanagawa (JP)

(73) Assignee: SHONAN GOSEI-JUSHI SEISAKUSHO K.K. (JP)

( * ) Notice: Subject to any disclaimer, the term of this patent is extended or adjusted under 35 U.S.C. 154(b) by 0 days.

(21) Appl. No.: 15/492,154

(22) Filed: Apr. 20, 2017

(30) Foreign Application Priority Data

Jun. 22, 2016 (JP) ................................. 2016-123142

(51) Int. Cl.
F16L 55/18 (2006.01)
F16L 55/165 (2006.01)

(52) U.S. Cl.
CPC ................. *F16L 55/165* (2013.01)

(58) Field of Classification Search
USPC ............... 138/97, 98; 405/151, 153
See application file for complete search history.

(56) References Cited

U.S. PATENT DOCUMENTS 2,474,172 A * 6/1949 Tinnerman ............ F16L 32/245
248/56
5,785,456 A * 7/1998 McAlpine ............... B29C 65/58
405/146
2010/0307624 A1 * 12/2010 Kamiyama ............... E03F 3/06
138/98
2013/0008549 A1 * 1/2013 Sakurada ............. F16L 55/163
138/98
2014/0246108 A1 * 9/2014 Kamiyama ....... F16L 55/16455
138/97

FOREIGN PATENT DOCUMENTS

JP 8001088 7/1996
JP 2014169711 9/2014
JP 3204790 6/2016

* cited by examiner

*Primary Examiner* — James Hook
(74) *Attorney, Agent, or Firm* — Adams & Wilks

(57) ABSTRACT

Segments are linked in the circumferential length to assemble a pipe unit, which is linked to another pipe unit using a link bolt to install a rehabilitating pipe inside an existing pipe. An elastically deformable clip having a cylindrical cavity with a notch is attached to the link bolt between the inner plates of the segment. The clip grips the link bolt at the cavity thereof that is enlarged due to elastic deformation. When the link bolt is moved in the direction opposite the insertion direction, the clip that grips the link bolt hits the inner plate of the segment to limit the movement of the link bolt in the opposite direction and prevent the link bolt from falling out of the segment.

6 Claims, 11 Drawing Sheets

PIPE REHABILITATION METHOD

BACKGROUND OF THE INVENTION

Field of the Invention

The present invention relates to a pipe rehabilitation method for installing a rehabilitation pipe inside an existing pipe using segments each of which comprises an inner surface plate constituting an inner circumferential surface, and side plates and end plates provided upright on peripheral edges of the inner surface plate, these plates being formed integrally from a plastic material and linked in the circumferential direction and in the pipe-length direction.

Description of the Related Art

In cases in which a sewage pipe or another pipeline buried underground has deteriorated through aging, a pipe lining method has been proposed and practiced in which a lining is provided to the inner circumferential surface thereof to repair the pipeline without excavating it from the ground.

In cases in which large-diameter pipelines are to be rehabilitated, segments are used each comprising an inner surface plate constituting an inner circumferential surface, side plates and end plates provided upright on the peripheral edges of the inner surface plate, these plates being integrally formed from a plastic material. The segments are linked in the circumferential direction to assemble pipe units, which are then linked in the pipe-length direction using link bolts to construct a rehabilitation pipe inside an existing pipe.

The pipe units are linked in the pipe-length direction in such a manner that the link bolt is passed through insertion holes in the side plates of one segment and screwed into a nut that is secured to another segment. In order to prevent the link bolt from falling out of the segment, JP 2014-169711 A1 (corresponding to U.S. Pat. No. 9,194,528 B2) proposes using a temporary lock that temporarily locks the link bolt to the segment.

SUMMARY OF THE INVENTION

The temporary lock described in JP 2014-169711 A1 is made from a sheet member having at its center an opening through which the link bolt can pass. The link bolt is temporarily locked due to a frictional resistance between the opening and the link bolt. This, however, doesn't ensure that the link bolt doesn't fall out of the segments, making it difficult to link the segments in the pipe-length direction.

It is therefore an object of the present invention to provide a pipe rehabilitation method that is capable of preventing the link bolt from falling out of the segment and easily linking the segments in the pipe-length direction.

The present invention provides a pipe rehabilitation method in which segments are linked in the circumferential and pipe length directions to install a rehabilitating pipe inside an existing pipe, each of the segments comprising an inner surface plate, side and end plates provided upright on peripheral edges of the inner surface plate, and a plurality of inner plates provided upright on the inner surface plate between the side plates. The method comprises securing a plurality of nuts to the inner plate of the segment along the circumferential direction thereof; inserting a link bolt into insertion holes formed in the side plate and the inner plate of the segment; attaching to the link bolt between the inner plates an elastically deformable clip that has a cylindrical cavity with a notch; aligning the segment into which the link bolt is inserted with the segment to which the nut is secured; and screwing the link bolt into the nut to link both the segments in the pipe-length direction. The clip grips the link bolt at the cavity thereof that is enlarged due to elastic deformation, and, when the link bolt is moved in the direction opposite the insertion direction, the clip that grips the link bolt hits the inner plate of the segment to limit the movement of the link bolt in the opposite direction and prevent the link bolt from falling out of the segment.

According to the present invention, an elastically deformable clip having a cylindrical cavity with a notch is used to grip a link bolt. A force of the clip for gripping the link bolt acts extending in the pipe-length direction, ensuring that the clip is attached to the link bolt. When the link bolt is caused to move due to gravity in the direction opposite the insertion direction, its movement is limited when the clip hits the inner plate because there is a strong grip force acting between the clip and the link bolt. This ensures that the link bolt is prevented from falling out of the segment.

Further features of the invention, its nature and various advantages will be more apparent from the accompanying drawings and following detailed description of the invention.

DESCRIPTION OF THE PREFERRED EMBODIMENTS

The present invention will now be described with references to embodiments illustrated in the accompanying drawings. The present invention is suitable for rehabilitating or repairing sewage pipes, water supply pipes, tunnels, agricultural irrigation channels, and other existing large-diameter pipes. In the present embodiment, the rehabilitation pipes are described as having a circular cross-section profile orthogonal to the pipe-length direction. However, it shall be apparent that the present invention can be applied to a rehabilitation pipe having a square or another non-circular cross-section. Also, in addition to structures in which the cross-section profile is closed as a pipe, a structure having a horseshoe-shaped, semi-circular, U-shaped, or another cross-section profile in which one side is open can also be considered to be a pipe, and the present invention can also be applied thereto.

Figure 2:
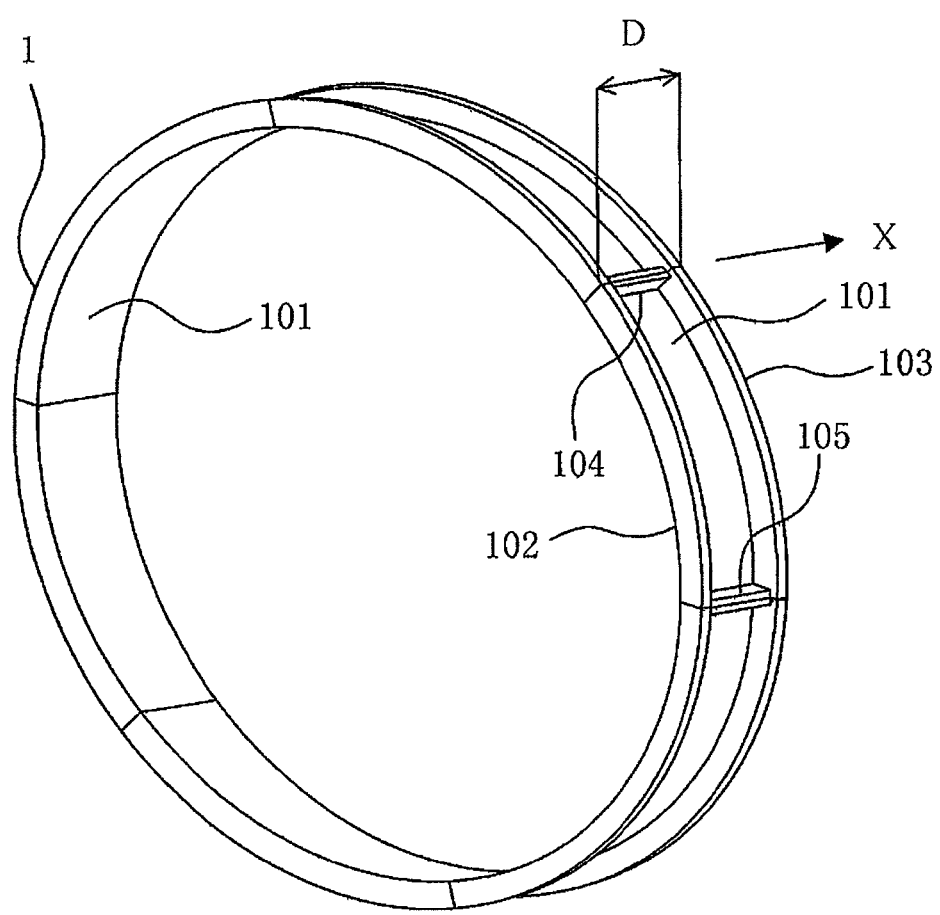
FIG. 2 is a perspective view showing a state in which the segments are linked in the circumferential direction to assemble a pipe unit.

In the present specifications, the pipe-length direction refers to the direction indicated by arrow X extending in the longitudinal direction of a pipe unit 10 in FIG. 2, and the circumferential direction refers to the direction of the circumference of the circle forming the pipe unit 10.

Figure 1:
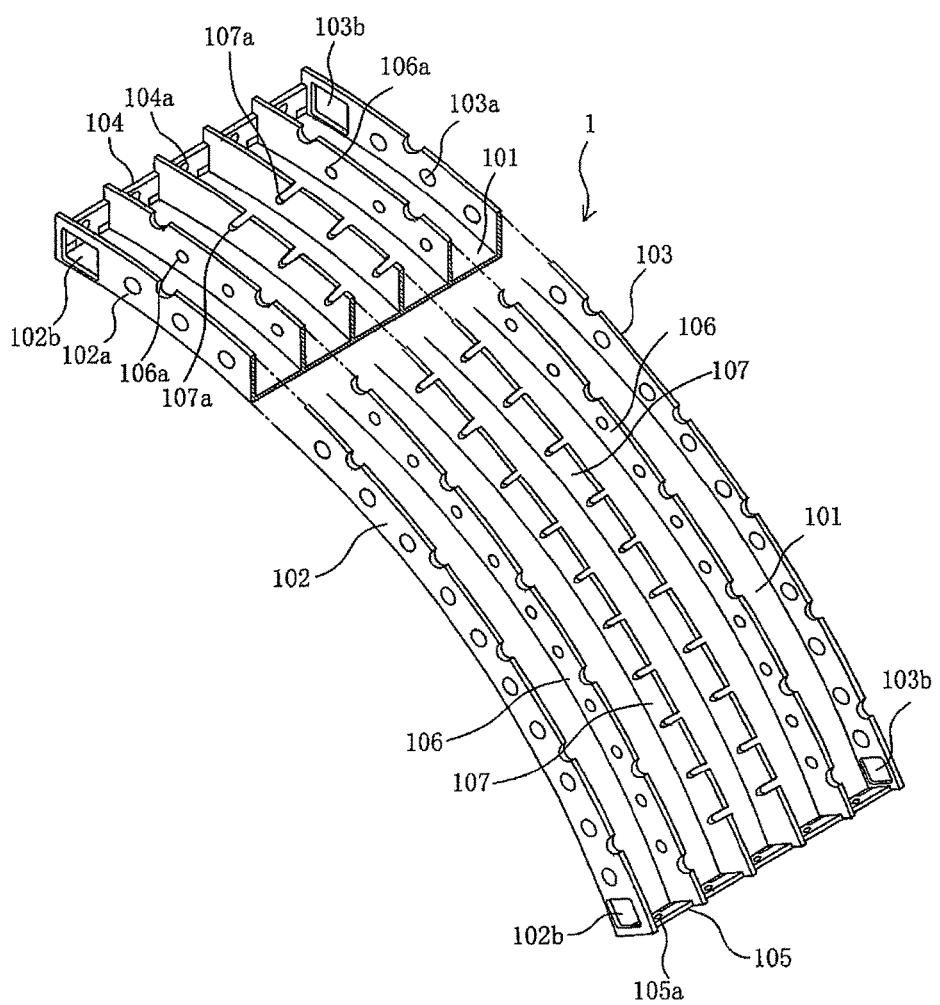
FIG. 1 is a perspective view showing the structure of a segment used in assembling the rehabilitation pipe.

FIG. 1 shows the structure of a segment 1 for pipe rehabilitation (hereafter simply referred to as "segment"). The segment 1 is an integrally formed block-shaped member made from a plastic material, comprising an inner surface plate 101 constituting an inner circumferential surface of the rehabilitation pipe, side plates 102, 103 with the same thickness provided vertically upright on both sides extending in the circumferential direction of the inner surface plate 101, and end plates 104, 105 provided vertically upright on both ends extending in the pipe-length direction of the inner surface plate 101.

In order to reinforce the mechanical strength of the segment 1, a plurality of inner plates 106, 107 having a shape similar to and the same thickness as the side plates 102, 103 are provided upright at equal intervals and parallel thereto on the upper surface of the inner surface plate 101 and on the inside relative to the side plates 102, 103.

The segment 1 has a shape that is curved as an arc representing a predetermined angle that equally divides the circumference, e.g., a 60° arc that divides the circumference into sixths. However, the segment may be shaped as, e.g., a cuboid or a shape that is bent so as to have a curved right angle depending on the cross-section profile or the size of the existing pipe or the location of the existing pipe to be repaired.

In order to link the segment 1 in the pipe-length direction, a plurality of circular insertion holes 102a, 103a for admitting insertion of a link bolt 11 and a nut 12 (FIGS. 3 and 4) are provided at equal intervals along the circumference on the side plates 102, 103. A plurality of circular insertion holes 106a for admitting insertion of the link bolt 11 are also provided at equal intervals on the inner plate 106. A plurality of notches 107a are provided at equal intervals on the inner plate 107 to provide a function as an insertion hole through which the link bolt can pass. The insertion holes 102a, 103a, 106a and the notches 107a are located at coinciding positions along the circumferential direction.

The end plates 104, 105 are disposed between the side plate 102 and the side plate 103. Provided on the end plates 104, 105 are circular insertion holes 104a, 105a for admitting insertion of a bolt or another linking member for linking the segment 1 in the circumferential direction.

The segments 1 are linked in the circumferential direction as follows: the end plate 105 of one segment is aligned in contact with the end plate 104 of another segment; a bolt 6 and a nut 7 (FIG. 3) are inserted from openings 102b, 103b (FIG. 1) in the side plates 102, 103; and the nut 7 is threadedly engaged to the bolt 6.

By sequentially linking the segments 1 in the circumferential direction around the full circumference, it is possible to assemble a ring-shaped pipe unit 10 having a predetermined length D in the pipe-length direction X as shown in FIG. 2. The outside diameter of the pipe unit 10 is slightly smaller than the inside diameter of the existing pipe to be rehabilitated. In FIG. 2, the inner surface plate 101, the side plates 102, 103, and the end plates 104, 105, which are the principal structural members of the segment 1, are shown. In order to prevent the drawing from becoming complicated, the inner plates 106, 107 and other reinforcement structures are not shown.

Figure 3:
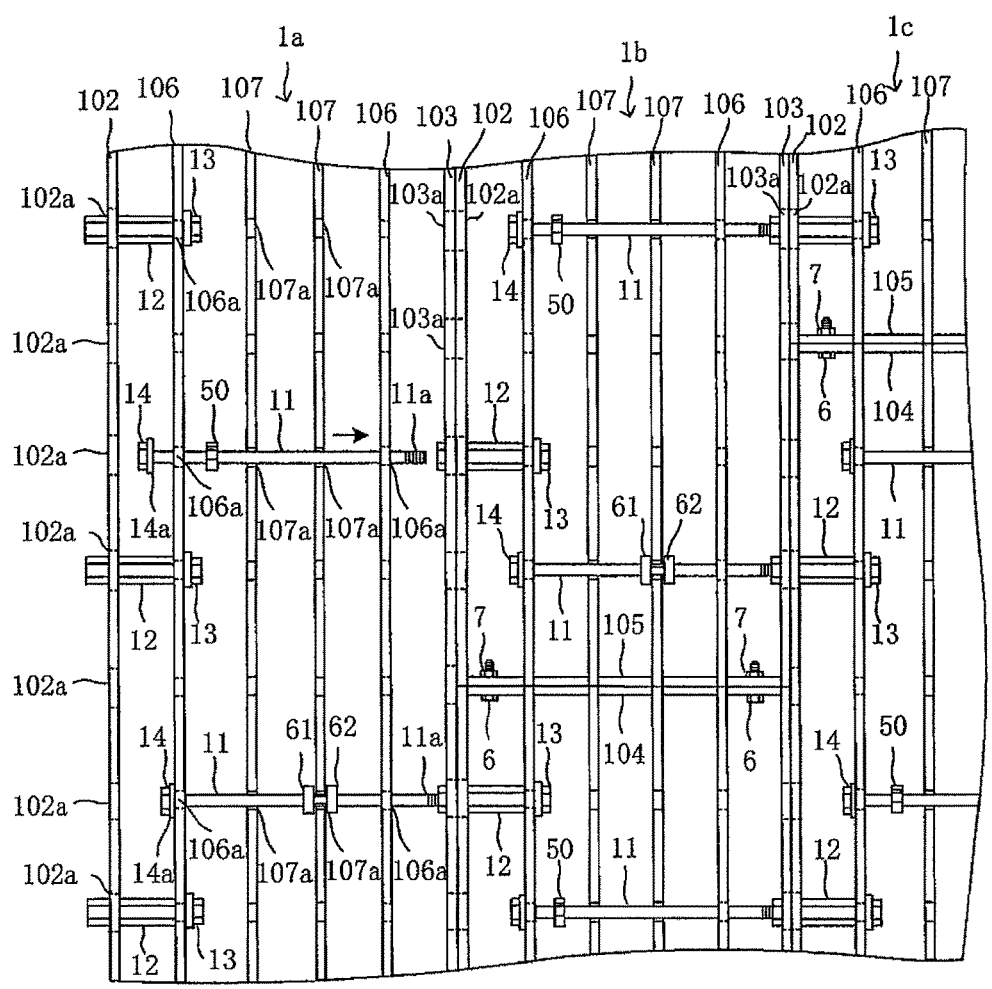
FIG. 3 is an illustrative view showing a state in which the segments of the pipe units are linked in the pipe-length direction using link bolts.

As shown in FIG. 3, the pipe units 10 are sequentially linked in the pipe-length direction. In FIG. 3, metallic nuts 12 are secured to the inner plates 106 of the segments 1a, 1b, 1c using bolts 13. The nut 12 is longer in the pipe-length direction than the interval between the side plate 102 and the inner plate 106, and protrudes from the side plate 102 of the segment, its protruding distance being equal to or greater than the thickness of the side plate 103 of another segment. A link bolt 11 extends in the pipe-length direction, and have at one end a screw part 11a screwed into the nut 12 and at the other end a hexagonal part 14 with a flange 14a.

In FIG. 3, the segments 1c and 1b have already been linked in the pipe-length direction, and the segment 1a is being linked to the segment 1b. When linking the segment 1a to the segment 1b, the nut 12 protruding from the side plate 102 of the segment 1b is passed through the insertion hole 103a in the side plate 103 of the segment 1a, thereby aligning the side plates 103, 102 of the segments 1a, 1b with each other.

The link bolt 11 is inserted through the insertion hole 102a in the side plate 102 of the segment 1a, the insertion holes 106a in the inner plates 106, and the notches 107a in the inner plates 107, and the screw part 11a thereof is screwed into the nut 12 secured to the segment 1b, thereby linking the bolt 11 to the nut 12. The link bolt 11 is further screwed into the nut 12 until the flange 14a thereof is pressed against the leftmost inner plate 106 of the segment 1a, thereby bolting the segments 1a, 1b in the pipe-length direction.

The segments of the pipe unit is thus linked in the pipe-length direction to the segments of the already linked pipe units for extension as desired in the pipe-length direction.

To improve linking efficiency, the link bolt is previously inserted into the segments constituting the pipe unit when linking the pipe units in the pipe-length direction, and the pipe unit into which the link bolts are inserted is linked to the pipe units that have already been linked. The link bolt inserted is likely to fall out of the segment. In the present embodiment, the link bolt is limited in movement in the direction opposite the insertion direction for prevention from falling out of the segment.

Figure 4:
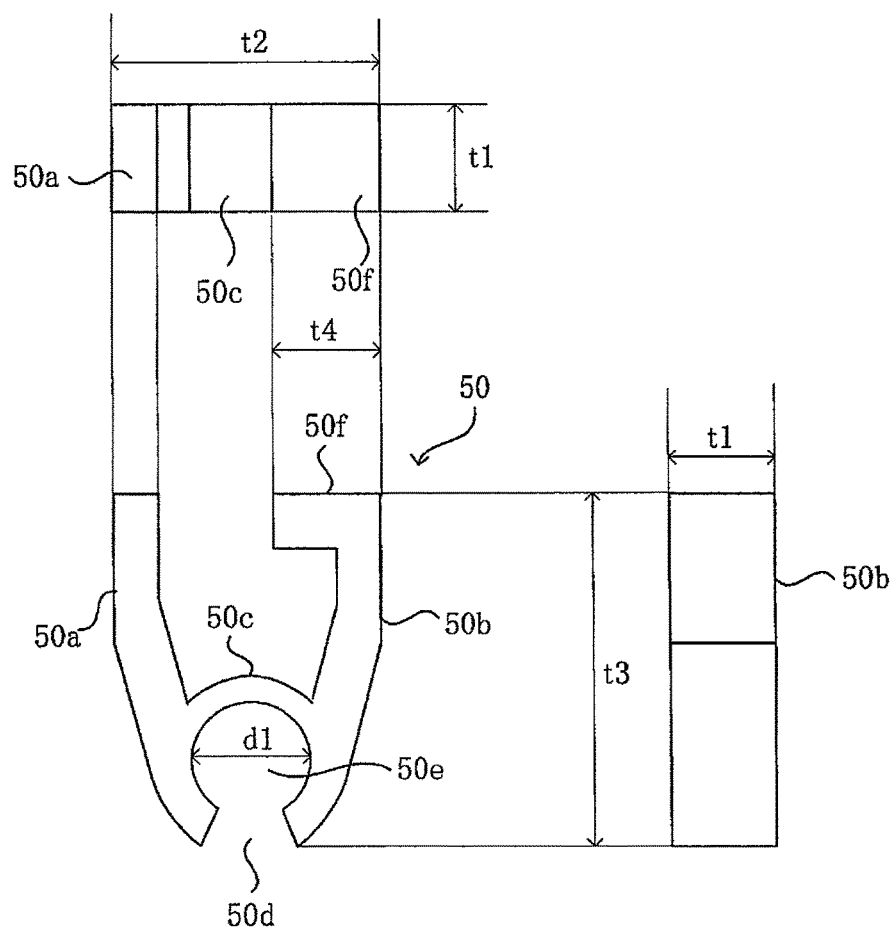
FIG. 4 is a view showing dimensions of a clip.

FIG. 4 shows a clip 50 that serves to prevent the link bolt from falling. The clip 50 includes arms 50a, 50b extending a length t1 in the pipe-length direction, and an integrally formed arc-shaped bridge 50c that is as thin (the same length t1) as or thinner than the arms 50a, 50b. The arms 50a, 50b are curved inward at their lower portions, and the inside surfaces of the arms 50a, 50b and the bridge 50c form a cylindrical cavity 50e that extends in the pipe-length direction with a notch 50d. The inside diameter d1 of the cavity 50e is equal to or smaller than the diameter of the link bolt 11.

The arm 50b of the clip 50 is bent inward at its upper portion, forming a bend 50f. A length t4 of the bend 50f in the circumferential direction is smaller than the interval between the outside surfaces of the arms 50a, 50b, i.e., a length t2 of the clip 50 in the circumferential direction, thus forming a gap between the bend 50f and the arm 50a. The bend 50f limits the inward movement of the arms at upper portions depending on the length of the gap formed. A height t3 of the clip 50 is lower than that of the side plates 102, 103, and the inner plates 106, 107 of the segment. Not only the arm 50b, but also the arm 50a may be bent to form a bend.

The arms 50a, 50b and the bridge 50c are integrally made from elastic plastics, e.g., thermoplastic resin such as polyethylene or polypropylene, or a kind of thermosetting resin. The clip 50 is cubic and elastically deformable, having the length t1 in pipe-length direction, the length t2 in the circumferential direction and the height t3. In the present embodiment, the length t1 is substantially the same as the inside diameter d1 of the cavity 50e, the length t2 is twice through three times longer than the length t1, and the height t3 is about three times longer than the length t1.

The bridge 50c of the clip 50 is as thin as or thinner than the arms 50a, 50b thereof. When an external force is applied inwardly to the upper portions of the arms 50a, 50b using fingers or tools, the bridge 50c is, as shown in the middle in FIG. 5, elastically deformed in the direction in which the notch 50d and the cavity 50e are enlarged, allowing the link bolt 11 to be inserted into the enlarged cavity 50e.

Figure 5:
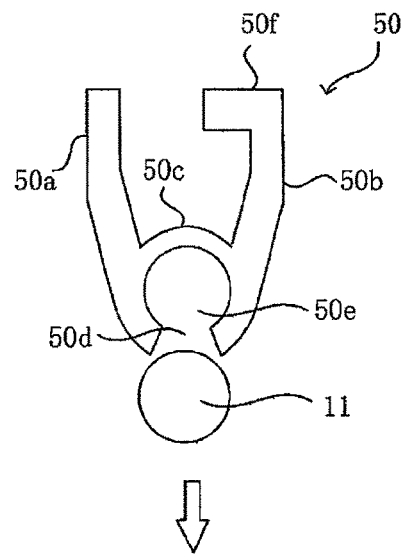
FIG. 5 is an illustrative view showing steps in which the clip is attached to the link bolt.
Figure 5:
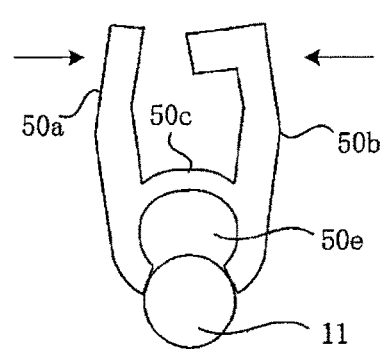
Figure 5:
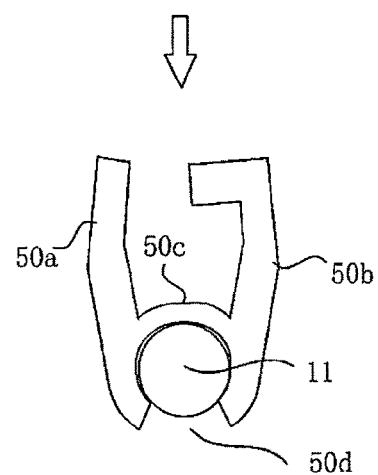

As shown at the bottom in FIG. 5, the clip 50 is further pressed downward with the external force being applied to the upper portions of the arms 50a, 50b. The link bolt 11 is then press-inserted through the notch 50d of the clip 50 into the cavity 50e thereof. Releasing the external force causes the bridge 50c to try to return to the original shape. This ensures that the link bolt 11 is gripped by the cavity 50e of the clip 50 with a predetermined force. Thus, the clip 50 can be attached to the link bolt 11.

A force of the clip 50 for gripping the link bolt 11 is determined such that the clip 50 is immovable relative to the link bolt 11 when the link bolt 11 is moved in the direction opposite its insertion direction due to gravity acting thereon and the clip 50 attached to the link bolt 11 hits the inner plate of the segment, while the link bolt 11 is movable relative to the clip 50 when it is moved in the insertion direction for screwing into the nut 12 and the clip 50 hits the inner plate of the segment.

Figure 6:
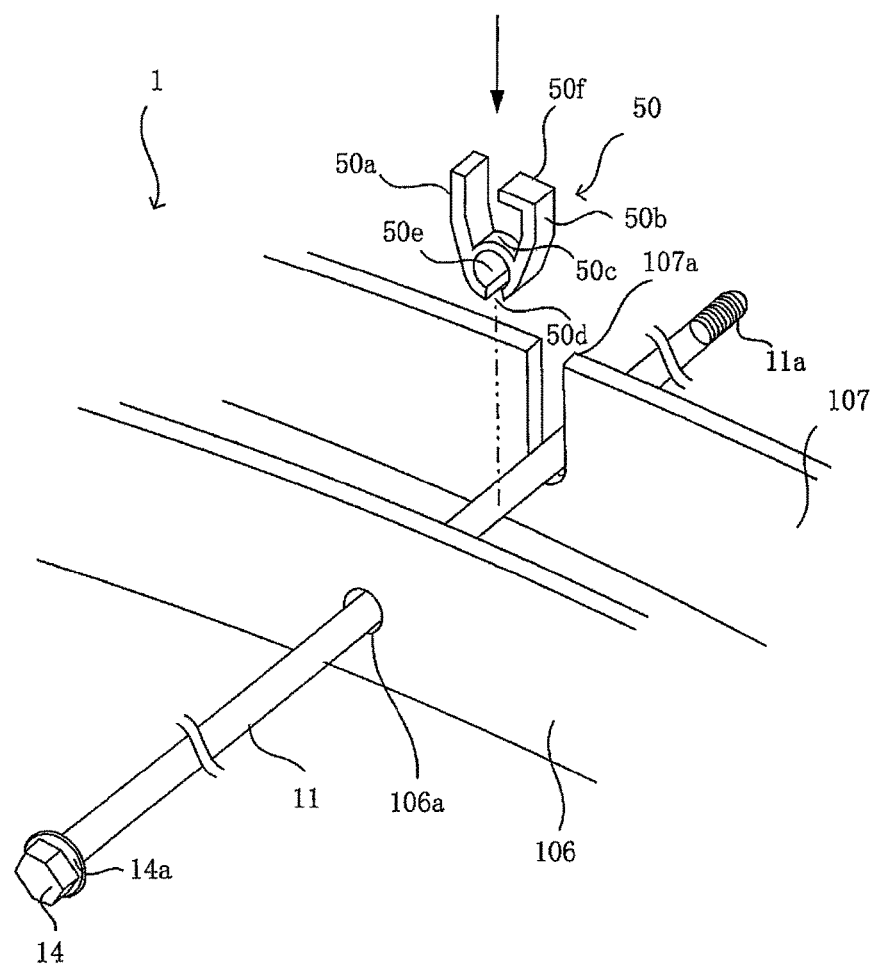
FIG. 6 is a perspective view showing in what manner the clip is attached to the link bolt.
Figure 7A:
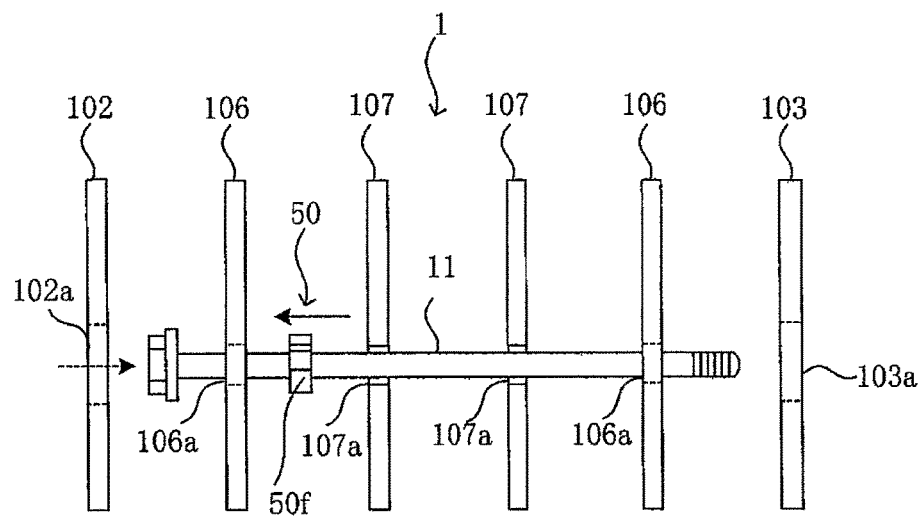
FIG. 7a is a top view showing a state in which the clip is attached to the link bolt.
Figure 7B:
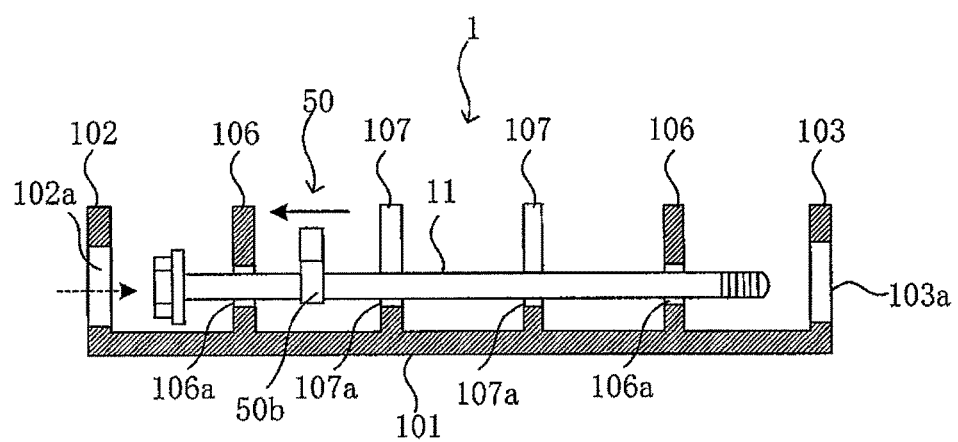
FIG. 7b is a side view showing a state in which the clip is attached to the link bolt.

FIG. 6 and FIGS. 7a and 7b show how the clip 50 is attached to the link bolt. When the link bolt 11 is inserted through the side plate 102 into all the inner plates 106, 107, the clip 50 is attached to the link bolt 11 between the first inner plate 106 and the next inner plate 107.

As shown in FIG. 5, in order to insert the link bolt 11 into the cavity 50e of the clip 50, an external force is applied inwardly to the upper portion of the clip 50 using fingers or tools to elastically deform and enlarge the notch 50d and the cavity 50e. When the external force is released, the clip 50 tries to return to the original shape and grips the link bolt 11 at the cavity 50e thereof with a predetermined force. This ensures that the clip 50 is attached to the link bolt 11.

Assuming that the segment 1 is inclined and gravity acts on the link bolt 11, as shown by the solid line in FIGS. 7a and 7b, the link bolt 11 moves in the direction opposite the insertion direction and the clip 50 hits the inner plate 106. However, the clip 50 doesn't move relative to the link bolt 11 due to its gripping force, thereby limiting the movement of the link bolt 11 in the opposite direction. Note that the movement of the link bolt 11 in the insertion direction is limited by the flange 14a of the link bolt 11 that hits the inner plate 106. This allows the link bolt 11 to be prevented from falling out of the segment 1 even if gravity acts thereon.

On the other hand, when the link bolt 11 is screwed into the nut 12 to link the segments in the pipe-length direction, a given force acts on the link bolt 11 as shown by the dotted line. This causes the link bolt 11 to be moved in the pipe-length direction and the clip 50 to hit the inner plate 107. However, the link bolt 11 is movable relative to the clip 50 against its gripping force even if the clip 50 stops by hitting the inner plate 107. Therefore, continuing to press the link bolt 11 with a predetermined force allows the link bolt 11 to be screwed into the nut 12 that is secured to the inner plate 106.

A description will now be given for a method for installing a rehabilitation pipe inside an existing pipe.

Figure 11:
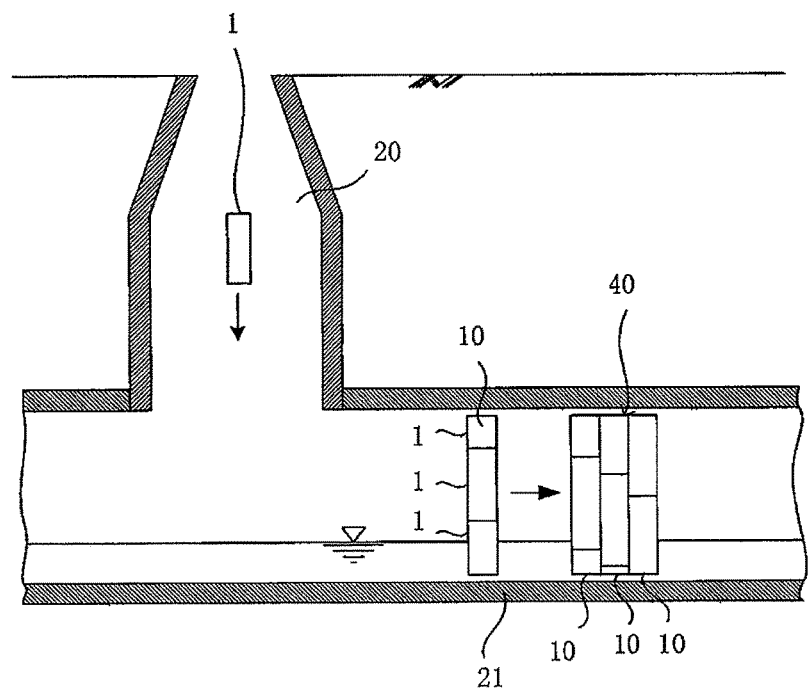
FIG. 11 is an illustrative view showing a state in which the pipe units are linked and the rehabilitation pipe is installed in the existing pipe.

First, as shown in FIG. 11, the segment 1 is carried through a manhole 20, and, as shown in FIG. 2, the segments 1 are sequentially linked in the circumferential direction inside the manhole 20 to assemble the pipe unit 10. The nuts 12 may be secured to the inner plate of the segment 1 along the circumferential direction before or after the segment 1 is carried into the manhole 20.

Next, the pipe units 10 are linked in the pipe-length direction using the link bolt 11. As shown in FIGS. 7a and 7b, the linking 11 is inserted into the insertion hole 102a of the side plate 102, the insertion holes 106a of the inner plates 106 and the notches 107a of the inner plates 107 of the segment 1, and, as shown in FIG. 5, the clip 50 is attached to the link bolt 11 between the inner plates 106, 107 to grip the link bolt 11 at its cavity 50e. This allows the link bolt 11 to be prevented from falling out of the segment 1. The insertion of the link bolt 11 into the segment 1 and the attachment of the clip 50 to the link bolt 11 may be performed before the segment 1 is carried into the manhole 20 or before the pipe units are assembled in the manhole 20.

The link bolt 11 is, for example, inserted into the insertion holes 102a, 106a of the segment 1 after it has been manufactured, and the segment 1 with the clip 50 attached to the link bolt 11 is stored in a storage box in preparation for transportation to a work site. The link bolt 11 can be prevented from falling out of the segment while storing the segment in the storage box or while carrying it to the work site. This allows the segments to be linked in the pipe-length direction efficiently.

As shown in FIG. 3, the segment into which the link bolt 11 is inserted is brought into alignment with the segment to which the nut 12 is secured, and the link bolt 11 is screwed into the nut 12 to link both the segments in the pipe-length direction. When the link bolt 11 is moved in the pipe-length direction for screwing to the nut 12, the link bolt 11 is movable relative to the clip 50 even if it hits the inner plate 107, ensuring that the link bolt 11 is screwed smoothly into the nut 12.

After the rehabilitation pipe 40 has been installed inside the existing pipe 21 by sequentially linking the pipe units 10 in the pipe-length direction, a filler such as a grout material or the like is injected into a space between the rehabilitation pipe 40 and the existing pipe 21, and the filler is hardened to provide a composite pipe comprising the existing pipe, the filler and the rehabilitation pipe.

In the present embodiment, the clip is cubic and elastically deformable, having a cylindrical cavity extending in the pipe-length direction, and it is used to grip the link bolt for attachment thereto. A clip force for gripping the link bolt acts extending in the pipe-length direction between the clip and the link bolt. The clip can thus be attached surely to the link bolt. The link bolt 11 is limited in movement due to a strong grip force acting on the link bolt, thereby ensuring that the link bolt is prevented from falling out of the segment even when the link bolt tends to fall out of the segment.

The clip 50 is attached to the link bolt 11 between the first inner plates 106, 107 as viewed in the pipe-length direction, but may be attached between the middle inner plates 107, 107 or between the last inner plates 107, 106.

Figure 8:
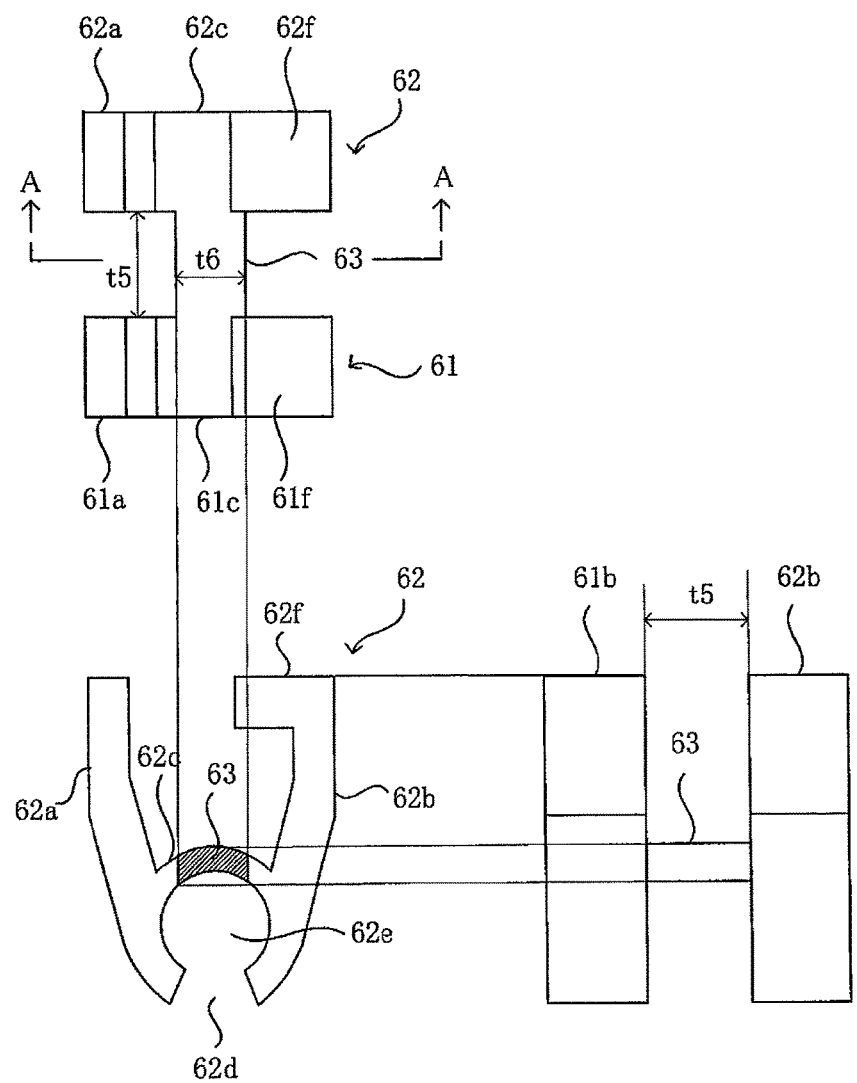
FIG. 8 is a view showing dimensions of another embodiment of a clip comprised of two clips shown in FIG. 4.
Figure 9:
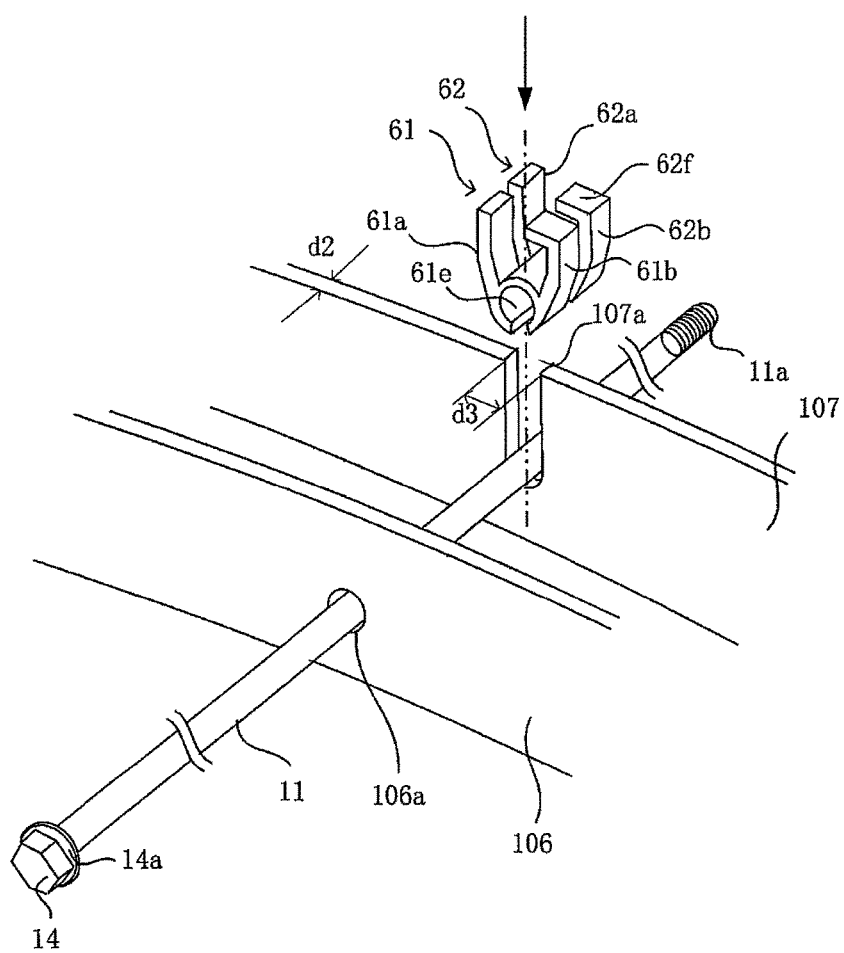
FIG. 9 is a perspective view showing in what manner the clip shown in FIG. 8 is attached to the link bolt.

The clip may be doubled for attachment to the link bolt, as shown in FIGS. 8 to 10.

In FIG. 8, a top view of clips 61, 62 is shown at the top, and a side view thereof on the right side. A view on the left side is a cross-sectional view along A-A line of the top view.

The clip 61 is the same in shape and material as the clip 50, and has arms 61a, 61b, a bridge 61c, a notch 61d, a cavity 61e, and a bend 61f each the same in shape as those of the clip 50. The clip 62 is also the same in shape and material as the clip 50, and has arms 62a, 62b, a bridge 62c, a notch 62d, a cavity 62e, and a bend 62f each also the same in shape as those of the clip 50. The clips 61, 62 are spaced apart by a length t5 that is greater than the plate thickness d2 of the inner plate 107. The bridges 61c, 62c are integrally connected to each other by a link 63 having the length t5 and a width t6 that is smaller than the notch width d3 of the inner plate 107.

Figure 10A:
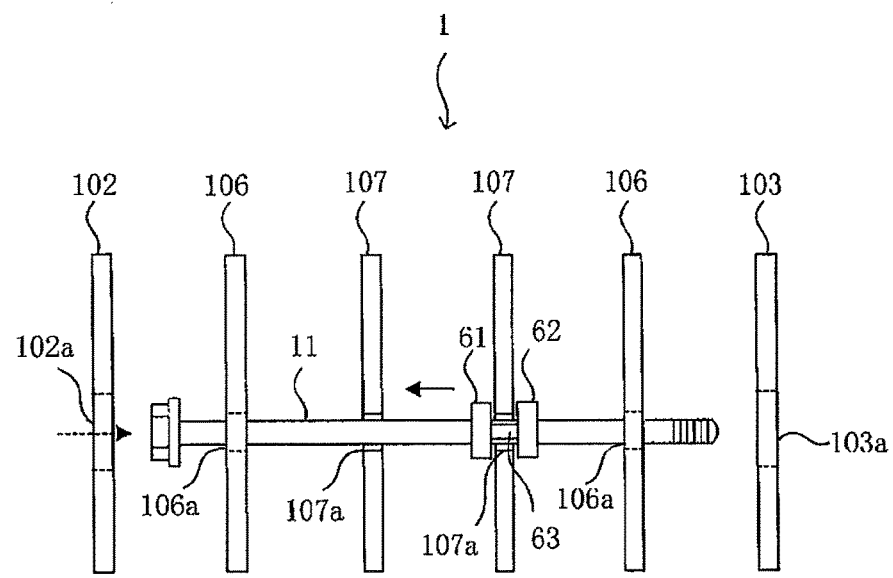
FIG. 10a is a top view showing a state in which the clip in FIG. 8 is attached to the link bolt.
Figure 10B:
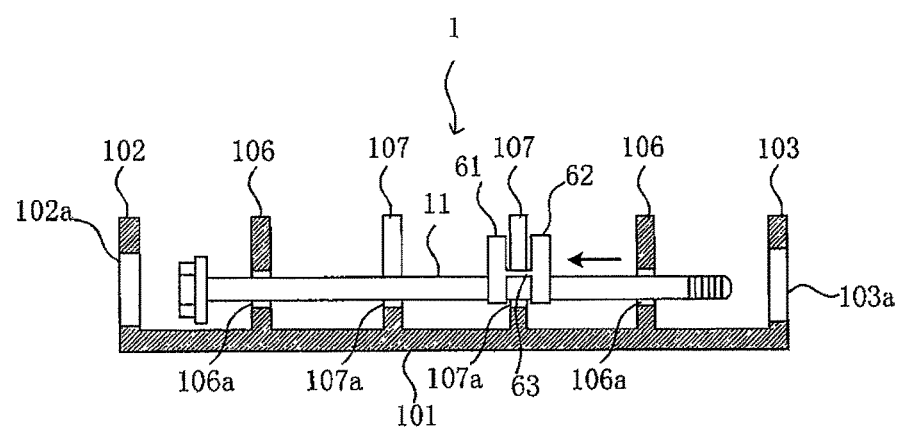
FIG. 10b is a side view showing a state in which the clip in FIG. 8 is attached to the link bolt.

The thus integrally formed doubled clip comprising the clips 61, 62 is, as shown in FIG. 9, and FIGS. 10a and 10b, inserted into the inner plate 107 from above with the link 63 fitted into the notch 107a of the inner plate 107 to grip the link bolt 11 at the cavities 61e, 62e thereof.

The thus doubled clip can apply a twice great grip force to the link bolt. Furthermore, the link bolt 11 is movable only about half the difference between the length t5 of the link 63 in the pipe-length direction and the plate thickness d2 of the inner plate 107. This provides such an advantage that the link bolt 11 is temporarily locked to the inner plate 107, improving the effect of preventing the link bolt from falling.

The present invention is applicable not only to a pipe rehabilitation method, but also to a shield construction method for performing an inner volume secondary lining after shielding.

What is claimed is:

1. A pipe rehabilitation method in which segments are linked in the circumferential and pipe length directions to install a rehabilitating pipe inside an existing pipe, each of the segments comprising an inner surface plate, side and end plates provided upright on peripheral edges of the inner surface plate, and a plurality of inner plates provided upright on the inner surface plate between the side plates, the method comprising:

securing a plurality of nuts to the inner plate of the segment along the circumferential direction thereof;

inserting a link bolt into insertion holes formed in the side plate and the inner plate of the segment;

attaching to the link bolt between the inner plates an elastically deformable clip that has a cylindrical cavity with a notch;

aligning the segment into which the link bolt is inserted with the segment to which the nut is secured; and screwing the link bolt into the nut to link both the segments in the pipe-length direction;

wherein the clip grips the link bolt at the cavity thereof that is enlarged due to elastic deformation, and, when the link bolt is moved in the direction opposite the insertion direction, the clip that grips the link bolt hits the inner plate of the segment to limit the movement of the link bolt in the opposite direction and prevent the link bolt from falling out of the segment.

2. A pipe rehabilitation method according to claim 1, wherein the insertion hole of the inner plate is formed as a notch, and the clip is doubled by integrally connecting the two clips using a link having a length greater than the plate thickness of the inner plate and a width smaller than the notch width of the inner plate, the link being fitted into the notch of the inner plate in order to attach the doubled clip to the link bolt.

3. A pipe rehabilitation method according to claim 1, wherein the clip includes two arms that are integrally coupled with an arc-shaped bridge, the arms being curved inward at their lower portions such that the inside surfaces of the arms and the bridge form a cylindrical cavity having a notch.

4. A pipe rehabilitation method according to claim 3, wherein the arc-shaped bridge is thinner than the arms.

5. A pipe rehabilitation method according to claim 1, wherein the upper portions of the arms are pressed inwardly to elastically deform the clip and enlarge the cavity.

6. A pipe rehabilitation method according to claim 1, wherein the arm of the clip is bent inward at its upper portion to provide a bend that limits the inward movement of the arm.

* * * * *